United States Patent [19]

Stahmer

[11] Patent Number: 5,228,648
[45] Date of Patent: Jul. 20, 1993

[54] RAILWAY FREIGHT BRAKE RETAINER VALVE DEVICE

[75] Inventor: Ulf Stahmer, Hamilton, Canada

[73] Assignee: Westinghouse Air Brake Company, Wilmerding, Pa.

[21] Appl. No.: 909,339

[22] Filed: Jul. 6, 1992

[51] Int. Cl.$^5$ .................................................. F16K 3/32
[52] U.S. Cl. ..................... 251/206; 251/208; 251/297; 303/75; 303/79
[58] Field of Search ............. 251/205, 206, 208, 297; 303/75, 79, 84.1, 84.2, 900, 901

[56] References Cited

U.S. PATENT DOCUMENTS

| | | | |
|---|---|---|---|
| Re. 27,514 | 10/1972 | Billeter | 303/79 X |
| 1,287,007 | 12/1918 | Harrison | 303/75 |
| 3,014,489 | 12/1961 | Lamp, Jr. et al. | 251/208 X |
| 3,406,720 | 10/1968 | Salton | 303/75 |
| 3,407,010 | 10/1968 | Weber, Jr. | 303/75 |
| 3,532,116 | 10/1970 | Scott | 303/79 X |
| 3,532,117 | 10/1970 | Racki | 303/79 X |
| 3,653,406 | 4/1972 | Racki | 303/79 X |
| 3,794,071 | 2/1974 | Scott | 303/79 X |
| 4,158,369 | 6/1979 | Storzinger et al. | 303/79 X |

*Primary Examiner*—John Rivell
*Attorney, Agent, or Firm*—G.J.F.

[57] ABSTRACT

A brake cylinder pressure retainer valve device for a railway car having a "direct" exhaust position, a "slow direct" exhaust position, and a "high pressure" retention position. A cavity in the retainer valve body has a central pedestal on which a rotary type disc valve is mounted. The disc valve has different sized ports via which pressure is connected from an inlet port (in the retainer valve body) to an outlet port depending upon the position of a manually operated handle to which the disc valve is connected. One such port is associated with a spring loaded check valve to provide the "high pressure" retention of the brake cylinder exhaust pressure. A laterally flexible sidewall of the disc valve member is formed with 180° opposed detent tabs for engagement with a plurality of detent grooves formed in the sidewall of the valve body within which the disc valve is operably disposed, the detent grooves being positioned to receive the detent tabs in accordance with the respective openings in the disc valve for alignment thereof with the inlet port in the different brake cylinder exhaust control positions. Plastic is the material of choice for this brake cylinder pressure retainer valve device.

26 Claims, 4 Drawing Sheets

5,228,648

RAILWAY FREIGHT BRAKE RETAINER VALVE DEVICE

BACKGROUND OF THE INVENTION

The present invention is related to brake cylinder pressure retainer valves for railway cars and particularly to a plastic type retainer valve.

Freight cars employing direct release brakes have long employed a brake cylinder pressure retainer valve to selectively control the release of the car brakes independently of the car control valve when descending long grades, in order to maintain a limited braking force during a brake release, while the brake pipe and associated reservoirs are being recharged in preparation for a subsequent brake application.

The standard FB-3 Retainer Valve presently supplied to the railroads is a three-position, manually operated valve to which the brake cylinder exhaust pipe is connected. In the "direct" exhaust position, the brake cylinder pressure is completely released unrestricted, in the "slow direct" exhaust setting, the brake cylinder pressure is released at a restricted rate, and in the "high pressure" retention setting, the brake cylinder pressure is released unrestricted until such time as the pressure is reduced to approximately 20 psi, and is then retained at this reduced pressure. The operating components of this valve are embodied in a cast iron body and provide such desirable features as leakage free operation for an extended service life; ease of handle movement; cartridge assembly replacement for simple and easy maintenance; and mounting on a semi-permanent pipe bracket.

SUMMARY OF THE INVENTION

It is the object of the present invention to provide a brake cylinder pressure retainer valve that is less expensive to manufacture, yet still provides the aforementioned desirable features offered by the standard FP-3 Retainer Valve.

In accordance with the foregoing objective, there is provided a brake cylinder pressure retainer valve device for a railway car including a main body in which is formed a chamber having an inlet port to which the brake cylinder exhaust air is connected and an outlet port via which the brake cylinder exhaust air is vented to atmosphere. The retainer valve further comprises a seal ring surrounding the inlet port within the chamber, a disc valve member rotatably disposed in the chamber between the inlet port and outlet port, the disc valve having a planar face on one side thereof engageable with the seal ring through a predetermined range of rotation and a plurality of openings at least two of which are different sized, said openings each extending from said planar side of said disc valve member to the side opposite said planar side, means for selectively rotating the disc valve member to different positions in which respective ones of said plurality of openings are aligned with the inlet port to vary the rate of flow of brake cylinder exhaust air from the inlet port to the exhaust port, and check valve means carried on the disc valve member in association with a first one of the plurality of openings for limiting the release of brake cylinder exhaust air to a certain chosen pressure in a predetermined one of the different positions of the disc valve member.

BRIEF DESCRIPTION OF THE DRAWINGS

These and other objects and advantages of the invention will become apparent from the following more detailed explanation when taken in conjunction with the accompanying drawings in which.

Figure 3:
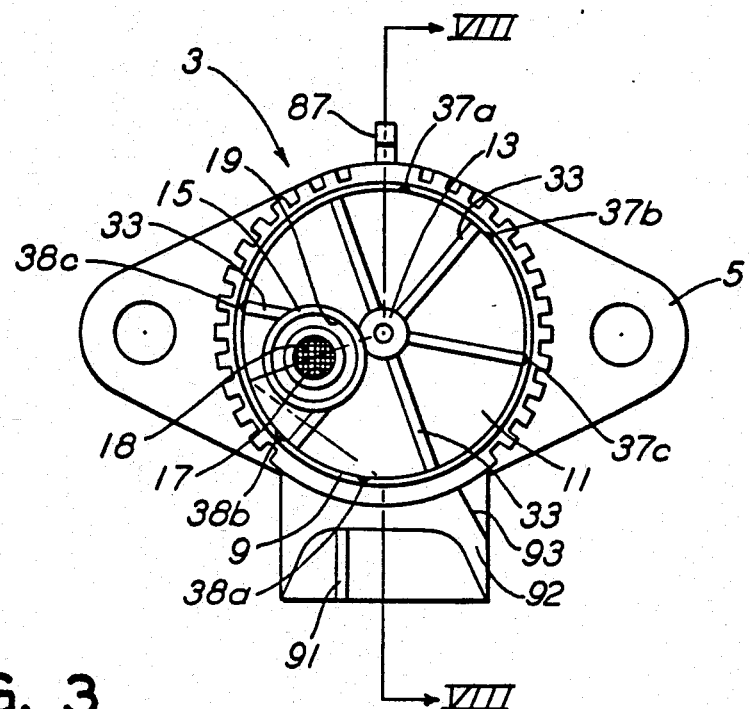
FIG. 3 is an outline view showing the front side of the retainer valve body.
Figure 4:
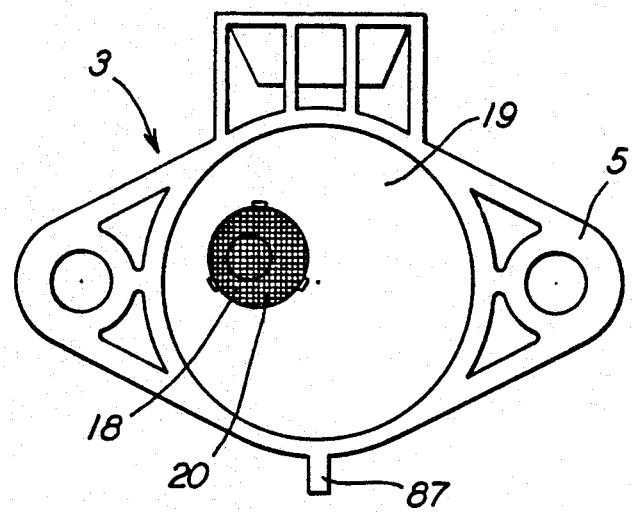
FIG. 4 is an outline view showing the back side of the retainer valve body.
Figure 5:
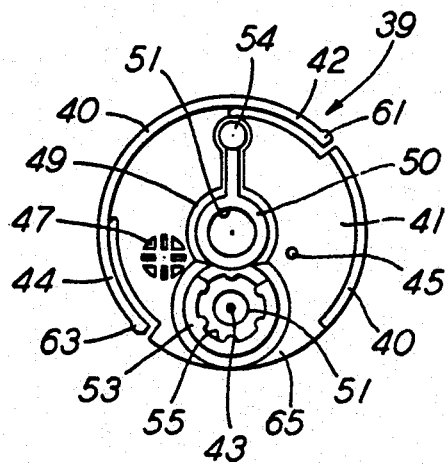
FIG. 5 is an outline view showing the top of the retainer valve disc valve.
Figure 6:
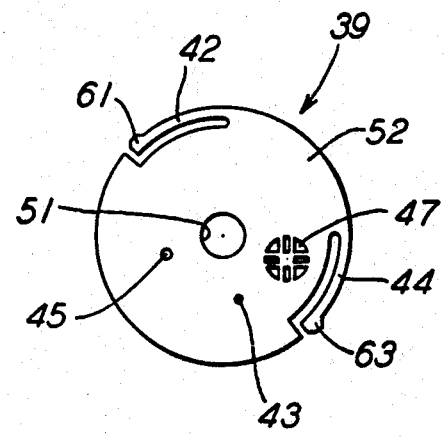
FIG. 6 is an outline view showing the bottom of the retainer valve disc valve.
Figure 7:
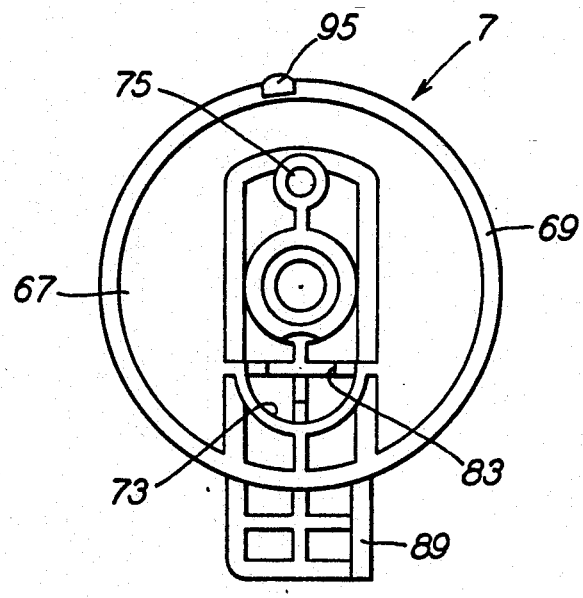
FIG. 7 is an outline view showing the under side of the retainer valve handle.

In each view 8A, 8B and 8C, the retainer valve body is shown as a section taken along the lines VIII—VIII in FIG. 3 and the coupled handle and rotary valve are rotated relative to the body to illustrate the retainer valve positions.

DESCRIPTION AND OPERATION

In accordance with the present invention, there is shown in the drawings a three position brake cylinder pressure retainer valve 1 having a molded plastic body 3 including an integral flange 5 via which retainer valve 1 may be bolted to a typical mounting bracket (not shown) that is secured to the body of a railway car. This mounting bracket has connected thereto one end of a brake cylinder exhaust pipe (not shown), the other end of which is connected to the exhaust port of the usual railway car brake control valve device (not shown). In bolting retainer valve 1 to the car mounting bracket, air that is exhausted from the car brake cylinder (not shown) via the car control valve device may be selectively controlled in one of three possible modes, depending upon the retainer valve handle 7 being set in a "direct exhaust" position EX, a "high pressure" retention position HP, or a "slow direct" exhaust position SD. Retainer valve handle 7 is also made from a suitable plastic material.

The retainer valve body 3 includes an annular sidewall 9 that is upraised from a base 11 formed by flange 5. Also upraised from base 11 within the cavity of sidewall 9 is a centrally disposed pedestal 13 and an annular boss 15 that is offset from pedestal 13. A bore 17 in boss 15 is connected via an opening 18 in base 11 to a cavity 19 formed on the back side of flange 5, which cavity 19 is surrounded by a sealing gasket 21 (FIGS. 8-10) to prevent leakage of brake cylinder exhaust air when flange 5 is bolted in place on its mounting bracket. This opening 18 forms an inlet port covered by a metal air strainer 20, via which cavity 19 is communicated with the cavity within sidewall 9. An opening 23 in sidewall 9 communicates the cavity within sidewall 9 with an exhaust port 25 having a vent protector 27. Surrounding the upper annular surface of boss 15 is a groove 29 containing an O-ring seal 31. Equally spaced along base 11 are a plurality of radial strengthening ribs 33, while the outside surface of sidewall 9 is formed with a plurality of fins 35 that serve the dual purpose of strengthening sidewall 9 and allowing the molded plastic body to cool at an even rate. Formed perpendicular to base 11 along the inner surface of sidewall 9 are detent grooves 37a, 37b and 37c that are spaced in accordance with the respective exhaust control positions. Also provided in sidewall 9 are additional detent grooves 38a, 38b and 38c spaced 180° apart from the respective counterpart grooves 37a, 37b and 37c.

Disposed in the cavity within sidewall 9 of body 3 is a plastic, cup-shaped, rotary, disc valve member 39 having a sidewall 40 that is upraised from a base plate 41 in which are formed different sized exhaust openings 43, 45 and 47. These openings are located on a radius corresponding to the radius on which the opening of inlet port 18 is located in body 3 and extend through base plate 41. Rotary disc valve member 39 includes a central boss 49 upraised from base plate 41 and having a bore 51 in which pedestal 13 of body 3 is received for rotatably mounting disc valve member 39, such that the upraised sidewall 40 is concentric with annular sidewall 9 of body 3 and a planar face 52 of base plate 41 rests on O-ring seal 31 of boss 15. Arranged 180° on opposite sides of boss 49 are a torque post 53 and a locating pin 54, torque post 53 having a fluted bore 55 terminating in a valve seat 57 with which a ball check valve 59 is cooperatively arranged, as shown in FIG. 8B. Bore 55 is aligned with the smallest exhaust opening 43 formed in base plate 41 of disc valve member 39. Sidewall 40 is formed on its outer surface with a pair of detents in the form of projecting, elongated tabs 61, 63 spaced 180° apart for engagement with elongated grooves 37, 38 in sidewall 9 of body 3 to define the rotary position of valve member 39. Base plate 41 of valve member 39 is separated from sidewall 40 along a section 42, 44 approximate detent tabs 61, 63, the cut-away portion of base plate 41 being sufficient to allow lateral flexure of sidewall sections 42, 44. Being made from a suitable plastic material, this flexure of sidewall sections 42, 44 is possible over a long service life without breakage. The degree of flexure of sidewall sections 42,44 is such as to permit detents 61, 63 to engage and disengage grooves 37, 38 in sidewall 9 of body 3 as rotary valve member 39 is rotated between the various brake cylinder exhaust control positions. Sidewall 9 is discontinuous, having an open area 65 that is aligned with opening 23 in sidewall 9 of body 3 when rotary valve member 39 is in "direct exhaust" position EX, in order to assure unrestricted flow of brake cylinder exhaust air to atmosphere when the retainer valve 1 is set for normal operation.

Handle 7 includes a circular cover 67 having a lip 69 around its perimeter that overhangs sidewall 9 of body 3 with sufficient space therebetween as to accommodate an O-ring seal 71. Annular openings 73, 75 are formed on the underside of handle 7 in which reception of the respective torque post 53 and locating pin 54 formed on rotary disc valve member 39 is provided. It is through this connection of handle 7 with torque post 51 and locating pin 53 that the rotary force of handle 7 is transmitted to rotary valve member 39.

Located in a central opening 76 of handle 7 between an inturned flange 78 and the top of pedestal 13 is a plastic spacer 77, the outside diameter of which is greater than that of pedestal 13, so as also to engage a recess 50 formed in the top of boss 49. Recess 50 is concentric with bore 51 to aid in positioning spacer 77 during assembly. A central passage 79 in spacer 77 is aligned with an opening 81 in pedestal 13. A screw 83 is threaded into opening 81 to connect handle 7 to body 3, while concurrently loading rotary valve member 39 with sufficient force to establish a pressure seal with O-ring 31. It will be appreciated that in molding the respective plastic components, the axial dimension of boss 49 between planar face 52 and recess 50, and also the axial dimension of pedestal 13 from the top of boss 15 to the top of pedestal 13 can be held to relatively close tolerance, so that in utilizing spacer 77 to bear on pedestal 13 and recess 50, a positive seal at O-ring 31 can be assured.

Disposed between the head of screw 83 and the top surface of spacer 77 is a washer 84 that may be integral with screw 83 or separate therefrom. The outer periphery of washer 84 extends beyond a reduced diameter section of spacer 77 to form an annular recess 86 in which the inturned flange 78 of central opening 76 projects. The axial dimension of annular recess 86 is greater than the axial dimension of inturned flange 78 to prevent handle 7 from being loaded down by screw 83.

Another opening 83 provided on the underside of handle 7 contains a compression spring 85, which bears on ball check valve 59 in rotary valve member 39 to establish the retention pressure in the "high pressure" retention position HP of handle 7. The three handle positions EX, HP, and SD may be marked on the top face of cover 67, so that when aligned with an index pointer 87 on body 3, the current valve position is indicated. Also incorporated in the tail of handle 7 is a depending web 89 that is engageable with a limit stop 91 that protrudes from the vent protector body 92 to prevent rotation of handle 7 in a counterclockwise direction when the retainer valve 1 is in its normal "direct" exhaust position EX. Another limit stop 93 on the vent protector body is adapted to engage a protruding lug 95 on the periphery of cover 67 to prevent rotation of handle 7 in a clockwise direction beyond the "slow direct" exhaust position SD.

Figure 1:
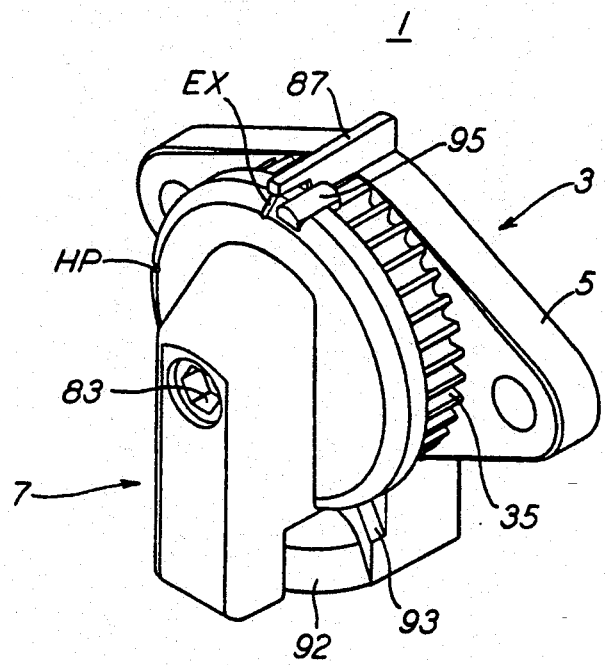
FIG. 1 is an isometric view of a retainer valve device according to the present invention.
Figure 2:
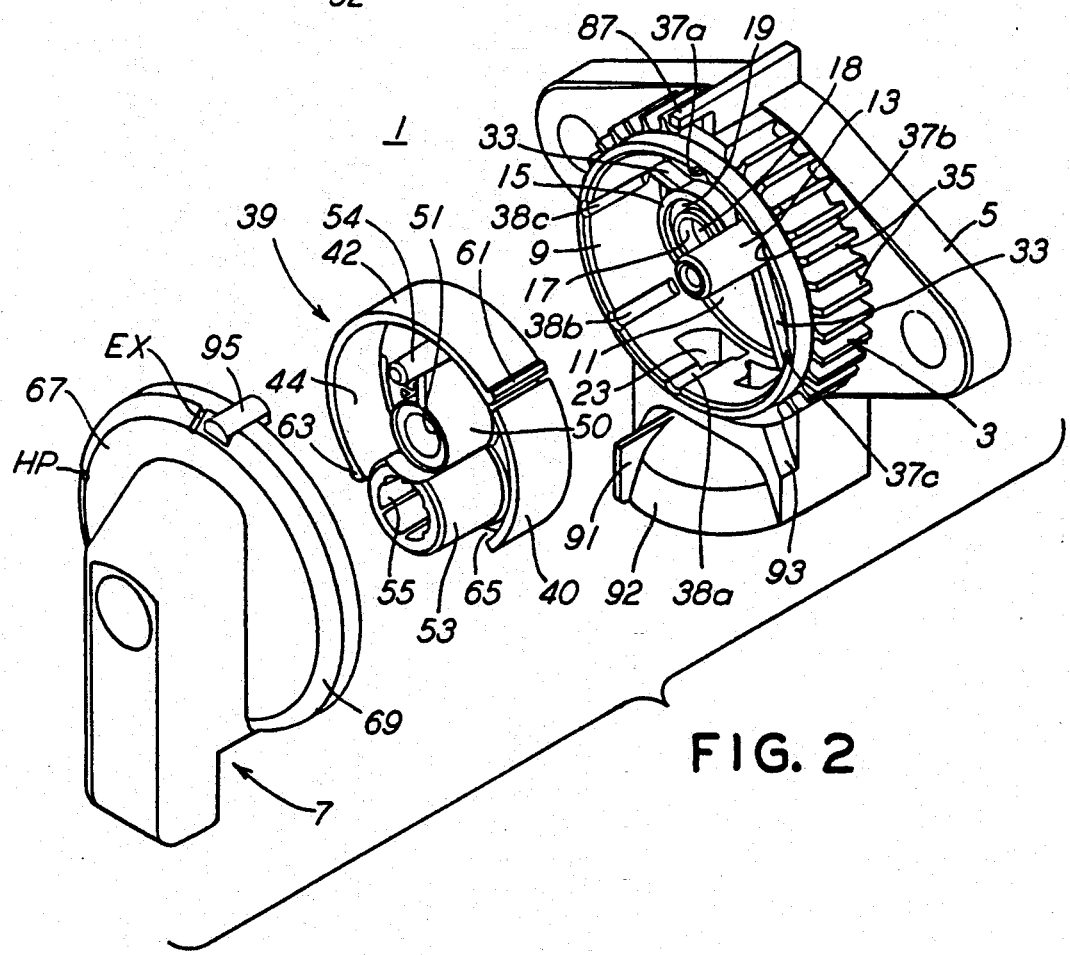
FIG. 2 is an exploded view showing the main components of the retainer valve of FIG. 1.
Figure 8A:
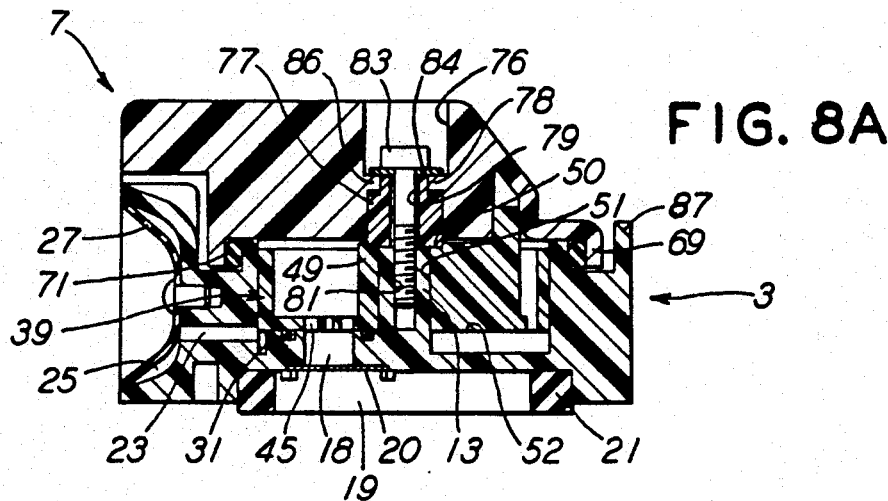
FIGS. 8A, 8B and 8C are sectional assembly views showing the retainer valve in its respective "direct" exhaust, "pressure retention", and "slow direct" exhaust positions.
Figure 8B:
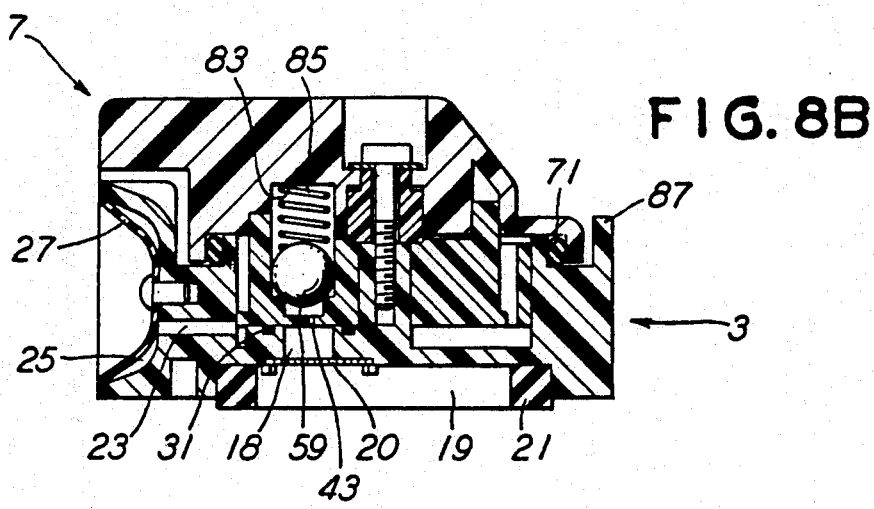

In the "direct" exhaust position EX, shown in FIG. 8A, handle 7, as well as the position mark EX on cover 67 are aligned with index pointer 87 (FIG. 1) and detent tabs 61, 63 are engaged with grooves 37a, 38a in sidewall 9 of body 3. Rotary valve member 39 is accordingly positioned to locate exhaust hole 47 in alignment with inlet port opening 18 in body 3, O-ring 31 effecting a pressure seal surrounding this connection. Also in this position of rotary valve member 39, the open area 65 of sidewall 40 is aligned with exhaust port 23 in the body sidewall 9. This hole 47 is larger than the other exhaust holes 43, 45, thus providing an unrestricted flow path from cavity 19 to the rotary valve exhaust cavity and thence to atmosphere via opening 65 in sidewall 40 and the exhaust port vent protector. The grid-like pattern of exhaust port 47 prevents O-ring seal 31 from being dislodged from its groove 29, as the face of rotary valve member 39 is rotated over inlet port opening 18. It will be appreciated that the "direct" exhaust position EX is the position in which retainer valve 1 is normally set, wherein a complete and direct unrestricted venting of the brake cylinder pressure is attained via the railway car control valve device.

In rotating handle 7 in a clockwise direction from the "direct" exhaust position EX to the "high pressure" retention position HP, as shown in FIG. 8B, detent tabs 61, 63 are cammed inwardly out of engagement with grooves 37a, 38a by reason of sidewall segments 42, 44 having lateral flexure. Rotation of handle 7 approximately 45° allows detent tabs 61, 63 to slide along the inside surface of sidewall 9 until aligned with further grooves 37b, 38b in the "high pressure" retention position HP. Engagement of detent tabs 61, 63 with grooves 37b, 38b positively establish the "high pressure" retention position of retainer valve 1, in which the position mark HP on cover 67 is aligned with index pointer 87. In this position, disc valve 39 has been rotated sufficiently to displace exhaust hole 47 from alignment with inlet port opening 18, and to in turn align the smallest exhaust hole 43 therewith. Being within the area of check valve seat 57, this restricted exhaust port 43 communicates the brake cylinder exhaust air from cavity 19 to ball check valve 59, which is unseated against the force of spring 85 until the brake cylinder pressure at cavity 19 falls below a predetermined value, such as 20 psi. The brake cylinder exhaust air flowing past unseated ball check valve 59 is vented via the rotary valve cavity, the annular area between sidewall 40 of rotary valve member 39 and sidewall 9 of body 3, exhaust port 23, and vent protector 25.

Subsequent closure of ball check valve 59 by engagement with valve seat 57 under the influence of spring 85 terminates the restricted rate of venting the brake cylinder exhaust air and retains the remaining brake cylinder air at the reduced pressure for which ball check valve spring 85 is selected.

Figure 8C:
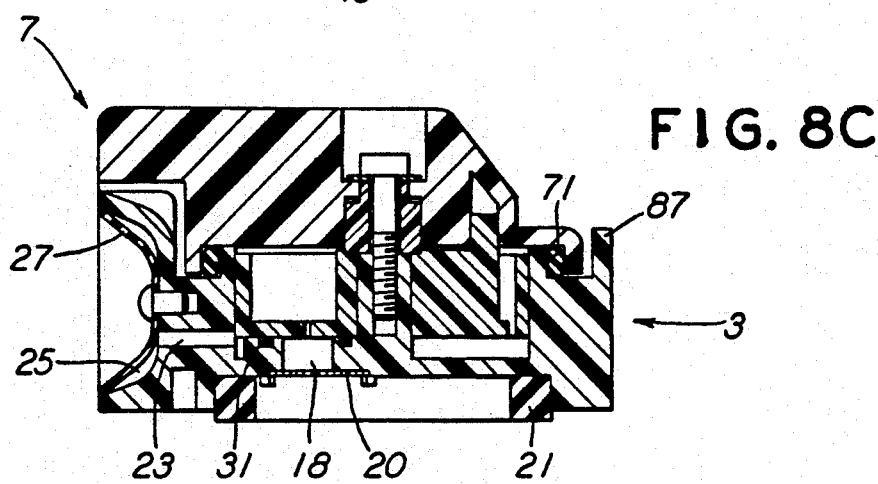

Further rotation of handle 7 in a clockwise direction from the "high pressure" retention position HP to the "slow direct" exhaust position SD, as shown in FIG. 8C, forces detent tabs 61, 63 to disengage grooves 37b, 38b, by the camming action therebetween and the ability of sidewall sections 42, 44 to flex laterally. Rotation of handle 7 approximately 90° beyond "high pressure" retention position HP allows detent tabs 61, 63 to engage grooves 37c, 38c corresponding to "slow direct" exhaust position, in which the position mark SD on cover 67 (not shown) is aligned with index pointer 87. In this position, exhaust hole 45 in base 41 of rotary valve member 39 is aligned with inlet port opening 18 within the bounds of O-ring seal 31. Brake cylinder air exhausted by the car control valve can thus flow from cavity 19 to atmosphere via opening 18, restricted exhaust hole 45, the cavity within sidewall 40 of rotary valve 39, the annular space between sidewall 40 and sidewall 9 of body 3, exhaust port 23, and vent protector 25. Consequently, brake cylinder pressure is fully exhausted at a restricted rate, as determined by the size of choked exhaust hole 45.

Further movement of handle 7 in a clockwise direction beyond "slow direct" exhaust position SD is prevented by engagement of lug 95 on cover 67 with limit stop 93 on the vent protector body.

What is claimed is:

1. A brake cylinder pressure retainer valve device for a railway car including a main body in which is formed a chamber having an inlet port to which brake cylinder exhaust fluid under pressure is connected and an outlet port via which the brake cylinder exhaust fluid under pressure is vented to atmosphere comprising:
   (a) a seal ring surrounding said inlet port within said chamber;
   (b) a disc valve member rotatably disposed in said chamber between said inlet port and said outlet port, said disc valve having a planar face on one side thereof engageable with said seal ring through a predetermined range of rotation, and a plurality of openings at least two of which are different sized, said openings each extending from said planar side of said disc valve member to the side opposite said planar side;
   (c) means for selectively rotating said disc valve member to different positions in which respective ones of said plurality of openings are aligned with said inlet port to vary the rate of flow of said brake cylinder exhaust fluid under pressure from said inlet port to said outlet port; and
   (d) check valve means carried on said disc valve member in association with a first one of said plurality of openings for limiting the release of brake cylinder exhaust fluid under pressure to a certain chosen pressure in a predetermined one of said different positions of said disc valve member.

2. A brake cylinder retainer valve device as recited in claim 1, wherein said plurality of openings comprise in addition to said first opening a second opening and a third opening, said second opening being more restrictive to flow of fluid under pressure than either one of said first and said third openings.

3. A brake cylinder pressure retaining valve device as recited in claim 2, wherein said third opening is more restrictive to flow of fluid under pressure than said first opening.

4. A brake cylinder pressure retaining valve device as recited in claim 3, wherein said first opening is substantially unrestrictive to flow of fluid under pressure.

5. A brake cylinder pressure retaining valve device as recited in claim 1, further comprising:
   (a) a base portion of said main body in which is formed said inlet port;
   (b) an annular sidewall of said main body upraised from said base portion forming therewith said chamber and having said outlet port formed therein;
   (c) said base portion further having an upraised pedestal formed within said chamber coaxial with said first sidewall; and
   (d) said disc valve member having a centrally disposed boss upraised from said opposite side of said disc valve member, said boss having a bore coaxial with said pedestal, said pedestal being received in said bore to rotatably support said disc valve member coaxially within said chamber.

6. A brake cylinder pressure retaining valve device as recited in claim 5, wherein said means for selectively rotating said disc valve member comprises:
   (a) a cover member cooperatively arranged with said first sidewall of said main body to enclose said chamber, said cover member being rotatable relative to said main body;
   (b) means for connecting said disc valve member to said cover member so as to be rotatable therewith; and
   (c) handle means on said cover for effecting rotation of said disc valve member to said different positions.

7. A brake cylinder pressure retaining valve device as recited in claim 6, wherein said means for connecting said cover member to said disc valve member comprises:
   (a) at least one torque post upraised from said opposite side of said disc valve member and displaced from said boss thereof;
   (b) said cover member having at least one opening in which said at least one torque post is disposed to transmit rotary force from said cover member to said disc valve member;

(c) said pedestal having a threaded bore therein;

(d) a central opening in said cover member; and (e) threaded fastener means in said opening of said cover member for engagement with said threaded bore in said pedestal.

8. A brake cylinder pressure retaining valve device as recited in claim 7, further comprising:

(a) said boss and said pedestal each having a top surface lying in a common plane;

(b) an annular spacer in said central opening of said cover member having a shoulder about its outer periphery formed by a reduced diameter portion at one end thereof and a central opening therethrough;

(c) said central opening in said cover having an inturned flange engageable with said shoulder, the other end of said spacer being engageable concurrently with said top surface of said boss and said top surface of said pedestal;

(d) said threaded fastener means including:

(i) a washer disposed in said central opening of said cover member, said washer being engageable with said inturned flange and said one end of said spacer such that the axial dimension between said washer and said shoulder is greater than the axial dimension of said inturned flange; and (ii) a screw in the opening of said washer and said central opening of said spacer, said screw having threaded engagement with said threaded bore in said pedestal.

9. A brake cylinder pressure retaining valve device as recited in claim 8, further comprising:

(a) said cover member having an annular lip on the side of said cover member adjacent said main body;

(b) said annular sidewall of said main body having a diameter less than the diameter of said annular lip so as to form an annular cavity therebetween; and (c) a seal ring in said annular cavity.

10. A brake cylinder pressure retaining valve device as recited in claim 7, wherein said check valve means comprises:

(a) a blind bore in said torque post into which one of said plurality of openings passes;

(b) an annular valve seat in said bore in surrounding relationship with said one of said plurality of openings;

(c) a ball valve in said bore; and (d) spring means between said ball valve and said cover member for urging said ball valve toward engagement with said annular valve seat.

11. A brake cylinder pressure retaining valve device as recited in claim 10, wherein the walls of said blind bore are fluted.

12. A brake cylinder pressure retaining valve device as recited in claim 10, wherein said plurality of openings comprise in addition to said first opening, a second opening and a third opening, said second opening passing into said blind bore, said second opening being more restrictive than either one of said first and said third openings.

13. A brake cylinder pressure retaining valve device as recited in claim 12, wherein said third opening is more restrictive to flow of fluid under pressure than said first opening.

14. A brake cylinder pressure retaining valve device as recited in claim 13, wherein said first opening is substantially unrestrictive to flow of fluid under pressure.

15. A brake cylinder pressure retaining valve device as recited in claim 6, further comprising detent means for increasing the resistance to rotation of said handle means in each one of said plurality of different positions of said disc valve member.

16. A brake cylinder pressure retaining valve device as recited in claim 15, wherein said detent means comprises:

(a) said annular sidewall of said main body having a plurality of elongated detent grooves formed in the inner surface thereof extending perpendicularly from said base portion;

(b) an annular sidewall of said disc valve member upraised from said opposite side thereof and being concentric with said axial bore in said centrally disposed boss, said annular sidewall of said disc valve member having formed on the outer surface thereof at least one projecting tab engageable with different ones of said plurality of detent grooves depending upon the selected position of said disc valve member.

17. A brake cylinder pressure retaining valve device as recited in claim 16, wherein said annular sidewall of said disc valve member is discontinuous so as to be absent in an area that is aligned with said outlet port in said sidewall of said main body when said disc valve member is in said predetermined one of said different positions.

18. A brake cylinder pressure retaining valve device as recited in claim 16, wherein said sidewall is separate from said disc valve member along at least one segment thereof to permit lateral flexure of said at least one segment, said at least one segment having said at least one projecting tab.

19. A brake cylinder pressure retaining valve device as recited in claim 18, wherein said at least one projecting tab is elongated in the direction of said plurality of detent grooves.

20. A brake cylinder pressure retaining valve device as recited in claim 18, wherein said at least one segment of said sidewall of said disc valve member is a pair of segments each having said projecting tab, said projecting tabs of said pair of segments being spaced 180° apart.

21. A brake cylinder pressure retaining valve device as recited in claim 20, wherein said plurality of detent grooves comprise a first plurality of detent grooves and a second plurality of detent grooves, each said first and second plurality of detent grooves corresponding in number to the number of said different positions of said disc valve member.

22. A brake cylinder pressure retaining valve device as recited in claim 21, wherein respective ones of said detent grooves in said first and second plurality thereof corresponding to each given one of said different positions of said disc valve member are spaced 180° apart.

23. A brake cylinder pressure retaining valve device as recited in claim 22, wherein the number of said detent grooves in each of said first and second pluralities of detent grooves corresponds to the number of said openings in said disc valve member.

24. A brake cylinder pressure retaining valve device as recited in claim 23, wherein said plurality of openings comprise in addition to said first opening a second opening and a third opening, said second opening being more restrictive to flow of fluid under pressure than either one of said first and said third openings.

25. A brake cylinder pressure retaining valve device as recited in claim 24, wherein said third opening is more restrictive to flow of fluid under pressure than said first opening.

26. A brake cylinder pressure retaining valve device as recited in claim 25, wherein said first opening is substantially unrestrictive to flow of fluid under pressure.

* * * * *